United States Patent Office.

JOSEPH NEWCOMER, OF BALTIMORE, MARYLAND.

Letters Patent No. 80,655, dated August 4, 1868.

IMPROVED COMPOSITION FOR DESTROYING INSECTS IN WHEAT.

The Schedule referred to in these Letters Patent and making part of the same.

TO ALL WHOM IT MAY CONCERN:

Be it known that I, JOSEPH NEWCOMER, of Baltimore, in the county of Baltimore, and State of Maryland, have invented a new and useful Composition of Chemical Matter for Destroying the Hessian-Fly in Wheat; and I do hereby declare that the following is a full, clear, and exact description thereof.

The Hessian-fly attaches, by a peculiar glue, its eggs upon the grain of wheat while in the milk or dough state, and is sown with the grain in the fall. Under favorable circumstances of heat and moisture, a portion of the eggs are hatched in the fall, and the fly immediately commences its depredations upon the growing crop.

Another portion may not be hatched until the spring; these, a few weeks before the harvest, deposit their eggs upon the grain growing in the field, and thus continue the successive production.

To destroy the midge while it is yet a nit, I have invented and use a certain chemical fluid, and have experimented with it through a period of eight or ten years. Wheat, after being treated by my solution, has never been affected by the Hessian-fly, while other crops in my immediate neighborhood suffered severely.

I make a salt brine strong enough to float an egg, then add sulphate of iron (copperas) in the following proportion: To a quantity of brine sufficient to cover ten bushels of grain, add one pound of copperas.

If the weather be very dry, allow the grain to soak in the above solution about five hours, but if damp, four hours will be sufficient. The wheat must not, under any circumstances, be allowed to soak more than five hours, as a longer time will generally destroy the germinating power of the grain.

After the grain is sufficiently soaked, it should be spread upon the barn or other floor, and slaked lime sifted over it, and well incorporated, with a shovel or otherwise. This will not only render the grain fit for sowing, in a very few minutes, but will add materially to the efficacy of the solution.

Having thus fully described my invention, what I claim as new, and desire to secure by Letters Patent, is—

The compound of the salt brine and copperas in the proportion, and the mode of treating the wheat, as hereinbefore fully described.

JOSEPH NEWCOMER.

Witnesses:
C. STORRS,
J. CURRY.